United States Patent Office 3,207,816
Patented Sept. 21, 1965

3,207,816
HIGH MOLECULAR WEIGHT UNSATURATED POLYESTER RESINS CONTAINING AN INTERPOLYMER OF AN α,β-UNSATURATED DICARBOXYLIC ACID ANHYDRIDE AND A MONOOLEFIN WITH A TERMINAL METHYLENE GROUP
Charles H. Dugliss, Yorktown Heights, N.Y., and Charles G. Laube, Weston, Conn., assignors to American Cyanamid Company, New York, N.Y., a corporation of Maine
No Drawing. Filed Dec. 9, 1960, Ser. No. 74,779
10 Claims. (Cl. 260—866)

This invention relates to novel high molecular weight polyester resinous compositions, to products prepared therefrom, and to methods of producing such compositions and products. More particularly, this invention relates to polyester resinous compositions comprising (1) the reaction product of (a) a reactive, essentially linear ethylenically unsaturated polyester resin with (b) an interpolymer of an α,β-ethylenically unsaturated dicarboxylic acid or anhydride and a monoolefin having a terminal methylene group, and (2) an ethylenically unsaturated monomeric cross-linking agent containing a $CH_2=C<$ group capable, under suitable physical reaction conditions of copolymerizing with component (1) to yield complex, cross-linked thermoset resins which are characterized as being insoluble and infusible.

Polyester resins are well known in the art, and are generically described as resinous reaction products resulting from the conjoint polymerization of an ethylenically unsaturated monomeric compound with a reactive, linear, ethylenically unsaturated polyester resin (alkyd), which is itself obtained by condensing an α,β-ethylenically unsaturated polycarboxylic acid or anhydride with a saturated aliphatic polyol.

While it is certainly true that polyester resins have achieved significant commercial importance in recent years, and equally true that they have been used in such diverse applications as laminates, adhesives, surface-coatings and castings, the fact remains that the laminating art, among those specifically mentioned, accounts for the bulk of the polyester resinous compositions produced today. However, this pre-eminence may well have been achieved solely by default, for despite the generally satisfactory properties exhibited by cured polyester resinous compositions in the laminating field, there remains considerable room for improvement with respect to certain properties or characteristics which are of considerable importance in other areas of use.

One such property is viscosity. There are many areas of end use wherein polyester resinous compositions having higher molecular weights and, consequently, higher viscosities, are not only desirable but oftentimes essential. For instance, in the preparation of a pigmented polyester resinous composition to be used in casting various articles of manufacture such as buttons, ornamental devices and the like, it is essential that the viscosity of the resinous component of the composition be sufficiently high so as to insure the pigment's remaining in suspension during the fabrication cycle. Failures in this respect lead to unattractive visual effects in the cast articles. Similarly, in a so-called pre-mix polyester, i.e., a polyester resinous composition containing a particulate or fibrous filler, it is essential that the viscosity of the resinous component be sufficiently high so as to insure that the filler will flow with the composition. If the viscosity of the resinous component is not high enough, said component will, in effect, flow around or past the filler, resulting in undesirable agglomeration of filler and, as a consequence, loss of mechanical strength in shaped articles prepared from the pre-mix.

It has long been recognized in the art that there is a direct correlation between the molecular weights of polymers and their viscosities, i.e., in general, the higher the molecular weight, the higher the viscosity. It is also well known that the preparation of relatively high molecular weight linear polyester resins by simply condensing or esterifying an α,β-ethylenically unsaturated polycarboxylic acid or anhydride with a saturated aliphatic polyol, either alone or in the presence of a non-polymerizable polycarboxylic acid, is limited by the very nature of the reactants themselves. In other words, continued heating of linear resin-forming mixtures of this type will not result in an indefinite buildup of molecular weight. In fact, a point is usually reached in such esterification reactions at which the average molecular weight of the linear resin reaches a substantially maximum value. It has been theorized that this phenomenon is attributable to the orientation of functional groups within the linear resin molecule, resulting not only in a form of steric hinderance but also in a force or strain being exerted on esterified carbonyl groups, which force or strain tends to influence their partial de-esterification. Consequently, it is believed that when the average molecular weight of a linear resinous esterification mixture reaches a substantially constant value, the situation has become one wherein esterification and de-esterification, occurring simultaneously, essentially balance out, the net result being that the average molecular weight remains more or less constant. Thus, the solution to the problem of how to increase the molecular weights and, correspondingly, the viscosities of polyester resinous compositions has, of necessity, been approached from other directions besides attempting to increase the molecular weights of the linear alkyds.

Perhaps the most common of such approaches have been the various attempts to increase the viscosity of the final polyester resinous compositions (linear alkyd plus cross-linking monomer) by increasing their degree of cross-linking. This has usually been accomplished by increasing the amount of α,β-ethylenically unsaturated polycarboxylic acid or anhydride used in preparing the linear alkyd. However, carrying out such a procedure so as to accomplish the desired result without detriment to other properties of the polyester resinous composition presents no less of a problem than that faced initially.

We have now discovered that modification of reactive, essentially linear ethylenically unsaturated polyester resins, prior to cross-linking, by the addition thereto of an interpolymer of an α,β-ethylenically unsaturated dicarboxylic acid or anhydride with a monoolefin having a terminal methylene group, results in linear alkyd resins having higher molecular weights than are readily obtainable by conventional procedures. It is our belief that the acid or anhydride groups in the added interpolymer react with alcoholic hydroxy groups present in the reactive, essentially linear ethylenically unsaturated polyester resin, thus combining several polymer molecules into one, with the interpolymer acting as the backbone, but we do not wish to be limited to any particular theory of reaction. In any event, the resulting linear alkyd, due to its improved viscosity, imparts many outstanding advantages to polyester resinous compositions prepared therefrom, advantages not found in compositions prepared from conventional prior art alkyds. For example, viscosities found to be desirable in known prior art polyester resinous compositions may be achieved in compositions containing our modified alkyd resins using considerably smaller amounts of said alkyds. It will readily be appreciated that this represents an important economic advantage. In addition, due to the increased molecular weights and viscosities found in our modified alkyd resins, polyester resinous compositions prepared therefrom undergo significantly smaller increases in viscosity in response to temperature increases than do the known prior art compositions under the same conditions.

It is, therefore, an object of our invention to prepare novel, modified polyester resinous compositions.

It is also an object of our invention to prepare novel, modified, reactive, linear ethylenically unsaturated polyester resins (alkyds), having higher molecular weights and viscosities than are readily obtainable by conventional procedures.

A further object of our invention is the preparation of polyester resinous compositions having viscosities sufficiently high so as to insure that pigments suspended therein will remain in suspension during subsequent processing steps.

A still further object of our invention is the preparation of polyester resinous compositions having viscosities sufficiently high so as to insure that particulate or fibrous fillers incorporated therein will flow with the compositions rather than agglomerate during subsequent processing steps.

These and other objects of our invention will be discussed more fully hereinbelow.

As is well known, essentially linear, ethylenically unsaturated polyester resins of the type employed in the practice of our invention are conventionally prepared by esterifying an $\alpha,\beta$-ethylenically unsaturated polycarboxylic acid or anhydride, alone or together with a non-polymerizable polycarboxylic acid or anhydride, with a saturated aliphatic polyhydric alcohol. In preparing our novel, modified polyester resinous compositions, we prefer that there be present at least a stoichiometric amount of said polyhydric alcohol, preferably 5 to 25% excess hydroxy groups as represented by the polyol over the carboxyl groups of the polycarboxylic acid component of the esterification mixture.

Among the $\alpha,\beta$-ethylenically unsaturated polycarboxylic acids that may be used are such as maleic, fumaric, substituted fumaric, such as monochlorfumaric, and the like, aconitic, itaconic, $\gamma$-alkyl itaconic, such as $\gamma$-methyl, -ethyl, -n-propyl, -isobutyl, etc., $\alpha$-alkyl itaconic, such as $\alpha$-ethyl itaconic, and the like, citraconic, $\gamma$-dimethylcitraconic, mesaconic, teraconic, glutaconic, muconic, and the like, as well as mixtures thereof. Non-polymerizable polycarboxylic acids, i.e., those which do not contain polymerizable $\alpha,\beta$-ethylenic unsaturation, may also be used if employed in combination with one or more of the aforementioned $\alpha,\beta$-ethylenically unsaturated polycarboxylic acids. Where such non-polymerizable polycarboxylic acids are employed, the amount thereof should not constitute more than about 80% of the total equivalents of carboxyl groups in the esterification mixture Preferably, such non-polymerizable polycarboxylic acids will be employed in amounts varying between about 35% and 75% of the above-indicated equivalence basis. Among the non-polymerizable polycarboxylic acids that may be used are such as oxalic, malonic, succinic, glutaric, sebacic, adipic, phthalic, isophthalic, terephthalic, substituted phthalic, such as tetrachlorophthalic, endomethylenetetrahydrophthalic, hexachloroendomethylenetetrahydrophthalic, and the like, pimelic, suberic, azelaic, tricarballylic, citric, tartaric, cyclopropanedicarboxylic, cyclohexanedicarboxylic, and the like, as well as mixtures thereof.

With respect to the saturated aliphatic polyhydric alcohols which may be employed in the preparation of our novel, modified linear alkyds, it is preferred that those containing only two hydroxyl groups be used. Among such diols are included ethylene glycol, propylene glycol, butylene glycol, diethylene glycol, dipropylene glycol, triethylene glycol, tetraethylene glycol, butanediol-1,2, butanediol-1,3, butanediol-1,4, pentanediol-1,2, pentanediol-1,4, pentanediol-1,5, hexanediol-1,6, neopentyl glycol, and the like, as well as mixtures thereof. However, saturated aliphatic polyhydric alcohols containing more than two hydroxyl groups may also be employed in the practice of our invention. Among such polyols are included glycerol, trimethylol ethane, trimethylol propane, pentaerythritol, sorbitol and the like, as well as mixtures thereof. It is usually desirable that such polyols containing more than two hydroxyl groups be employed in minor proportions relative to the diol or diols used.

The mixture of polyhydric alcohol, polycarboxylic acid or anhydride and interpolymer, or the various mixtures of each, that will be employed in the preparation of our novel modified alkyds should be sufficiently reacted so as to ultimately produce alkyds having acid numbers not appreciably more than about 95 nor appreciably less than about 5. Preferably, the acid number of said alkyds will range from about 30 to about 35.

The interpolymers utilized in the practice of our invention are, as previously mentioned, prepared from an $\alpha,\beta$-ethylenically unsaturated dicarboxylic acid or anhydride, such as maleic anhydride, and a monoolefin having a terminal methylene group, such as ethylene. Interpolymers of this type and methods for their preparation are so well known in the art (for example, see U.S. Patent No. 2,378,629 to Hanford) that an elaborate description thereof is not needed here. Other $\alpha,\beta$-ethylenically unsaturated dicarboxylic acids or anhydrides which may be employed together with or in place of maleic anhydride include fumaric, substituted fumaric, such as monochlorfumaric, and the like, itaconic, aconitic, citraconic, and the like, as well as mixtures thereof. Similarly, other monoolefins having terminal methylene groups which may be employed in place of or in admixture with ethylene include propylene, butene-1, isobutylene, 3-methyl-butene-1, pentene-1, hexene-1, 2,4,4-trimethylpenetene-1 (diisobutylene), styrene, and the like, as well as mixtures thereof. The molecular weight of the interpolymers suitable for use in the practice of our invention will preferably range from about 1,000 to 100,000, as determined by intrinic viscosity measurements [see Flory, "Principles of Polymer Chemistry" (Ithaca, N.Y., Cornell University Press, 1953), pages 308 to 311], and the amount of interpolymer or mixtures of interpolymers employed may be from about 0.05% to about 10% by weight, based on the total weight of resin-forming components charged. Preferably, the amount of this reactant utilized will range from about 0.2% to about 3%, on the same weight basis as referred to above.

The reactive components used to prepare our novel, modified alkyds may be reacted in the manner customarily observed in preparing reactive, ethylenically unsaturated polyester resins, i.e., at elevated temperatures and atmospheric pressure, although pressures slightly above or below atmospheric may be employed if desired. The reaction temperature is not critical. The preferred temperature will usually be just below the boiling point of the most volatile component of the reaction mixture which is generally the polyol. However, temperatures in excess of the boiling point of the most volatile constituent may be employed if the reaction vessel has been equipped with a steam-heated reflux condenser, which permits water of esterification to escape from the reaction vessel while condensing volatilized reaction components and returning them to the reaction sphere. Similarly, the order of addition of the components of the reaction mixture is not critical, i.e., all three components (the polyhydric alcohol, the polycarboxylic acid or anhydride, and the interpolymer) may be charged together, or the first two (polyol and polycarboxylic acid or anhydride) may be partially reacted before the interpolymer is introduced. In this latter case, however, it is preferred to add the interpolymer at a point at which the reaction product of the polyol and polycarboxylic acid or anhydride still has an acid number greater than 100, so that there will be sufficient water of esterification remaining to dissolve the interpolymer. In addition, since resinifying reactants of this type are prone to develop undesirable coloring when in contact with air at elevated temperatures, it is generally good practice to conduct the reaction under an inert atmosphere, such as that provided by gaseous carbon dioxide, nitrogen, and the like being bubbled through the reaction mixture.

In preparing polyester resinous compositions from our novel, modified alkyds, said alkyds are combined with a polymerizable, ethylenically unsaturated monomeric cross-linking agent containing a $CH_2=C<$ group and desirably having a boiling point, at atmospheric pressure, of 60° C. or greater.

Among such polymerizable compounds there are included styrene, side chain substituted styrenes such as the $\alpha$-methyl styrene, $\alpha$-ethyl styrene, and the like, ring substituted styrenes, such as alkyl styrenes, e.g., ortho-, meta- and para-alkyl styrenes, e.g., o-methyl styrene, p-ethyl styrene, meta-propyl styrene, 2,4-dimethyl styrene, 2,5-diethyl styrene, and the like, halostyrenes, e.g., o-bromostyrene, p-chlorostyrene, 2,4-dichlorostyrene, and the like. Alkyl esters of acrylic and methacrylic acid, e.g., methyl, ethyl or butyl acrylate, methyl methacrylate, and the like, may also be employed. In addition, one may also use aliphatic vinyl esters such as vinyl acetate, vinyl butyrate, vinyl laurate, acrylonitrile, methacrylonitrile, vinyl chloride, and the like. Further, acrylamide, methacrylamide and their derivatives may be employed. Still further, one can make use of the allyl compounds such as diallyl phthalate, allyl acetate, allyl methacrylate, diallyl carbonate, allyl lactate, allyl $\alpha$-hydroxyisobutyrate, allyl trichlorosilane, allyl acrylate, diallyl malonate, diallyl oxalate, diallyl gluconate, diallyl methyl gluconate, diallyl adipate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylenetetrahydrophthalic anhydride, triallyl tricarballylate, triallyltrimesate, triallyl aconitate, triallyl cyanurate, triallyl citrate, triallyl phosphate, trimethallyl phosphate, tetraallyl silane, tetraallyl silicate, hexallyl disiloxane and the like. These polymerizable, ethylenically unsaturated monomeric cross-linking agents may be used singly or in combination with one another.

The ratio of the reactive alkyd to the monomeric cross-linking agent may be varied over a wide range and, therefore, this ratio is not critical. For example, the unsaturated reactive resin content may range from about 10 to about 90% of the total weight of this copolymerizable mixture. For most purposes, however, our polyester resinous compositions will comprise from about 30 to 60 parts of the unsaturated resin and correspondingly from about 70 to 40 parts of the polymerizable monomer.

In order to facilitate the copolymerization of the monomeric cross-linking agent with the reactive resin, it is preferred that a polymerization catalyst be incorporated in the composition at the time of its curing. The type and amounts of these catalytic materials which may be used are well known in the art, and any material which normally induces polymerization of polyester resinous compositions can be utilized. The optimum reaction conditions are modified to some extent by the choice of the particular catalyst used in the process. A very active catalyst should be used in lower concentrations, and preferably at lower temperatures, than a less reactive material. The catalysts that are preferably employed comprise a wide variety of organic superoxides, i.e., organic peroxides ("acidic peroxides") and hydroperoxides ("alcoholic peroxides"). Mixtures of peroxides and hydroperoxides, including commercially available mixtures such as methyl ethyl ketone peroxide, cyclohexanone peroxide, and the like, are especially effective as catalysts. Among the organic peroxide catalysts that may be employed are such as acetyl peroxide, benzoyl peroxide, substituted benzoyl peroxides, and particularly halogenated benzoyl peroxides such as p-bromobenzoyl peroxide, 2,4-dichlorobenzoyl peroxide, etc., benzoyl acetyl peroxide, phthalyl peroxide, succinyl peroxide, fatty oil acid peroxides, such as cocoanut oil peroxide, lauryl peroxide, stearyl peroxide, oleyl peroxide, anisoyl peroxide, toluyl peroxide, and the like. Organic peracids, such as peracetic acid and perbenzoic acid, may also be employed. Among the organic hydroperoxide catalysts that may be employed are such as tertiary butyl hydroperoxide, cumene hydroperoxide, diisopropyl benzene hydroperoxide, 1-hydroxycyclohexyl hydroperoxide, the terpene oxides, such as ascaridole, 1-p-menthane hydroperoxide, etc., and the like Various other types of polymerization catalysts may also be employed, for example, compounds such as aluminum chloride, stannic chloride, boron trifluoride, or the azo-type catalysts such as $\alpha,\alpha'$-azobisisobutyronitrile.

Since the polyester constituents of the resinous compositions mentioned above contain a high degree of polymerizable unsaturation, it is often desirable to incorporate a polymerization inhibitor therewith. The inhibitor, i.e., a material whose primary function is to retard internal polymerization of the polyester constituent of the resinous composition, effects stabilization of the composition during any storage period encountered prior to curing. However, once the resinous composition is contacted with a sufficient amount of a polymerization catalyst, the effect of the inhibitor will be overcome. Among the inhibitors that may be used are such as phenol; the monoalkyl phenols, such as ortho-, meta-, and para-cresol, as well as mixtures of such isomers; polyalkyl phenols having a plurality of the same or different substituents, e.g., ethyl, propyl, butyl, and higher alkyl radicals attached to their nuclei; catechol, tertiary butyl catechol, hydroquinone, tertiary butyl hydroquinone, resorcinol, eugenol guaiacol, pyrogallol, benzaldehyde, tannic acid, ascorbic acid, isoascorbic acid, phenylene diamine, sym-di-$\beta$-naphthyl-p-phenylene diamine, aniline, and the like. The amount of polymerization inhibitor employed depends on the nature of the polyester resinous composition as well as the period of storage stability required. Generally, from about 0.001% to 0.3% by weight, based on the total weight of polymerizable reactive components present, will be sufficient.

Inhibitors of this type may be added to the reactive resin during the preparation thereof or optionally added later to the compounded polyester resinous composition. In addition, other known additives may be employed such as promoters used in conjunction with the catalyst, mold lubricants, fillers and reinforcements, colorants, flow promoters, ultraviolet absorbing compounds, and the like.

The conditions necessary for curing the polyester resinous compositions of this invention do not depart from the practice ordinarily observed in curing this type of composition. They may be cured in contact with air or in enclosed molds at temperatures ranging from about 10° C. to about 160° C. or even higher as long as they are kept below the point at which the particular resinous composition employed begins to decompose. Where it is convenient, it is especially desirable to cure the resinous compositions by heating the catalyzed, resin-forming mass to between 90° C. and about 150° C. for a period of about 3 to 90 minutes.

In order that those skilled in the art may more fully understand the inventive concept presented herein, the following illustrative examples are set forth. These examples are given solely by way of illustration, and should not be considered as expressing limitations unless so set forth in the appended claims. All parts and percentages are by weight, unless otherwise stated.

EXAMPLE I 6.8 mols of propylene glycol, 4.0 mols of maleic anhydride, 2.0 mols of phthalic anhydride and 0.008% by weight, based on the total weight of the reaction mixture, of hydroquinone were charged to a suitable reaction vessel equipped with thermometer, stirrer and steam-heated reflux condenser and heat-reacted until the exotherm resulting from the rupture of the anhydride ring in the maleic anhydride component was reached, as evidenced by a sudden rise in reaction temperature to approximately 160° C. At this point, 0.1% by weight, based on the total weight of the reaction mixture, of DX 840–11, a commercially available ethylene-maleic anhydride interpolymer having a molecular weight of approximately 2000 was added and the reaction continued until an acid number of 32.4 was reached. The reaction mixture was then cooled to 120° C. and cut with ⅓ its weight of styrene. The viscosity of the resulting polyester resinous composition was V–W on the Gardner-Holdt scale at 25° C.

EXAMPLE II

Following the procedure of Example I, the same amounts of propylene glycol, maleic anhydride, phthalic anhydride and hydroquinone were heat-reacted until the exotherm was reached and then admixed with 2% by weight, based on the total weight of the reaction mixture, of the same commercially available ethylene-maleic anhydride interpolymer. The resulting reaction mixture was heat-reacted to an acid number of 36.3, cooled to 120° C., and cut with 30% of its weight of styrene to give a polyester resinous composition which had a Gardner-Holdt viscosity of $Z_4$–$Z_5$ and which was stable for >24 hours.

EXAMPLE III

A reaction mixture of propylene glycol, maleic anhydride, phthalic anhydride, hydroquinone and ethylene-maleic anhydride interpolymer identical to that described in Example II was heat-reacted to an acid number of 32.2 before being cooled to 120° C. and cut with ⅓ its weight of styrene. The resulting polyester resinous composition had the following characteristics:

*Table I*

| | |
|---|---|
| Viscosity (Gardner-Holdt) | $Z_1$–$Z_2$ |
| SPI [1] time to gel _____seconds__ | 130 |
| SPI time to peak _____do____ | 217 |
| SPI peak temperature _____° C__ | 200 |

[1] Society of Plastics Industry, Inc., Standard Test, as shown in "Proceedings, Sixth Annual Technical Session, Reinforced Plastics Div., SPI, 1951."

EXAMPLE IV

To a suitable reaction vessel equipped with thermometer, stirrer and steam-heated reflux condenser there was charged 3.0 mols of maleic anhydride, 3.0 mols of phthalic anhyride, 6.6 mols of propylene glycol and 0.02% by weight based on the total weight of the reaction mixture, of tertiary butyl catechol. This reaction mixture was heated at reflux until the reaction temperature rose to approximately 160° C., at which point there was added 1.5% by weight, based on the total weight of the reaction mixture, of an ethylene-maleic anhydride interpolymer having a molecular weight of approximately 2000. Heating was continued until an acid number of 29.4 was reached. The reaction mixture was then cooled to 120° C. and blended with 30% of its weight of styrene, giving a polymerizable polyester resinous composition which was stable for >24 hours and which had a viscosity of $Z_2$–$Z_3$ as measured on the Gardner-Holdt scale.

EXAMPLE V

The procedure outlined in Example IV was followed with the exception that 4.0 mols of maleic anhydride, 2.0 mols of phthalic anhydride, 6.6 mols of propylene glycol, 1% by weight, based on the total weight of the reaction mixture, of the ethylene-maleic anhydride interpolymer, and 0.02% by weight, also based on the total weight of the reaction mixture, of tertiary butyl catechol were used. The heat reaction was carried out until an acid number of 30.4 was reached, at which time the reaction mixture was cooled to 120° C. and blended with 30% of its weight of styrene. The resulting polyester resinous composition had the following characteristics:

*Table II*

| | |
|---|---|
| Viscosity (Gardner-Holdt) | $Z_1$+ |
| Stability _____hours__ | >24 |
| SPI time to gel _____seconds__ | 210 |
| SPI time to peak _____do____ | 255 |
| SPI peak temperature _____° C__ | 216 |

EXAMPLES VI AND VII

Polyester resinous compositions were prepared in the manner of the preceding examples from the reactants listed below:

*Table III*

| Reactant [1] | VI | VII |
|---|---|---|
| Propylene glycol | 6.6 | 6.6 |
| Maleic anhydride | 4.0 | 4.0 |
| Phthalic anhydride | 2.0 | 2.0 |
| Tertiary butyl catechol,[2] percent | 0.02 | 0.02 |
| Interpolymer,[3] percent | 2 | 1.5 |
| Styrene, percent | 30 | 30 |
| Acid No | 30.4 | 32.0 |

[1] In mols, unless otherwise shown.
[2] Inhibitor.
[3] Commercially available ethylene-maleic anhydride interpolymer having a molecular weight of approximately 2000.

In each case, the first five reactants listed in Table III were heat-reacted, in the manner described in the preceding examples, until the indicated acid numbers were reached. The resin solutions were then cooled to 120° C. and blended with styrene.

In order to further show the outstanding improvement in viscosity (without loss of other important properties) in polyester resinous compositions prepared in accordance with our invention as compared to a conventional (unmodified) polyester resinous composition, the following data are presented:

*Table IV*

| Property | Resin | | |
|---|---|---|---|
| | VI | VII | A [1] |
| Viscosity [2] | >Z | $Z_4$–$Z_5$ | T–V |
| SPI time to gel [3] | 255 | 262 | 225 |
| SPI time to peak [3] | 345 | 348 | 345 |
| SPI peak temp. (° C.) | 180 | 187 | 218 |
| Flex. strength (rm. T) | 14,000 | 13,600 | 13,500 |
| Flex. modulus (rm. T) | 0.58 | 0.61 | 0.65 |
| Tensile strength | 7,800 | 9,200 | 7,500 |
| Elongation, percent | 1.5 | 1.8 | 0.5 |
| H₂O absorption, percent | 0.26 | 0.25 | 0.34 |
| Barcol hardness | 50 | 54 | 49 |

[1] Resin A is a commercially available polyester resinous composition having the following constituents:
  Propylene glycol, mols _____ 6.6
  Maleic anhydride, mols _____ 4.0
  Phthalic anhydride, mols _____ 2.0
  Hydroquinone, percent _____ 0.008
  Styrene, percent _____ 33.3
[2] Gardner-Holdt.
[3] In seconds.

It is apparent from these figures that the modification of the present invention will increase the viscosity of a polyester resinous composition without detriment to its other physical properties. In fact, as is clearly demonstrated above, many of these properties are even improved when polyester resinous compositions are modified in accordance with our invention.

EXAMPLE VIII

A polyester resinous composition modified in accordance with our invention and containing:

| | |
|---|---|
| Propylene glycol _____ mols__ | 6.6 |
| Maleic anhydride _____ do____ | 3.0 |
| Phthalic anhydride _____ do____ | 3.0 |
| Tertiary butyl catechol [1] _____ percent__ | 0.02 |
| Interpolymer [2] _____ do____ | 2 |
| Styrene _____ do____ | 30 |

[1] Inhibitor.
[2] Commercially available ethylene-maleic anhydride interpolymer having a molecular weight of approximately 2000.

was prepared in precisely the same manner as the compositions of Examples VI and VII (heat-reacted to an acid number of 33.6), and its properties compared with those of a commercially available polyester resinous composition (Resin B) containing:

| | |
|---|---|
| Propylene glycol _____ mols__ | 6.6 |
| Maleic anhydride _____ do____ | 3.0 |
| Phthalic anhydride _____ do____ | 3.0 |
| Hydroquinone _____ percent__ | 0.008 |
| Styrene _____ do____ | 31.0 |

The results of this comparison are as follows:

Table V

| Property | Resin | |
|---|---|---|
| | VIII | B |
| Viscosity [1] | $Z_4$-$Z_5$ | Z-$Z_1$ |
| SPI time to gel [2] | 305 | 210 |
| SPI time to peak [2] | 405 | 315 |
| SPI peak temp. (° C.) | 175 | 196 |
| Flex. strength (rm. T) | 17,300 | 11,800 |
| Flex. modulus (rm. T) | 0.58 | 0.67 |
| Tensile strength | 9,700 | 10,200 |
| Elongation, percent | 2.1 | 1.8 |
| H₂O absorption, percent | 0.19 | 0.21 |
| Barcol hardness | 42 | 50 |

[1] Gardner-Holdt.
[2] In seconds.

Again it is evident that polyester resinous composition modified in accordance with our invention suffer no loss in other physical properties even though they have significantly greater viscosities than similar unmodified compositions.

In each of Examples VI–VIII, the polyester resinous compositions prepared were cured according to a Standard Polyester Cycle, i.e., after adding 0.5% by weight of benzoyl peroxide to each composition, they were subjected to a heating cycle of 8 hours at 120° C., followed by 6 hours at 120–250° F., and finally 2 hours at 250° F.

It will be obvious that other changes and variations may be made in carrying out the present invention without departing from the spirit and scope thereof as defined in the appended claims.

We claim:

1. A reactive, linear ethylenically unsaturated polyester resin which comprises the reaction product of (1) an ethylenically unsaturated polyester resin prepared by esterifying an α,β-ethylenically unsaturated dicarboxylic acid with a saturated aliphatic polyol, and (2) an interpolymer of an α,β-ethylenically unsaturated dicarboxylic acid anhydride and a monoolefin having a terminal methylene group, wherein (2) is present in an amount of from about 0.05 to about 10% by weight, based on the total weight of resin-forming components.

2. A reactive, linear ethylenically unsaturated polyester resin which comprises the reaction product of (1) an ethylenically unsaturated polyester resin prepared by esterifying an α,β-ethylenically unsaturated polycarboxylic acid with a saturated aliphatic polyol, and (2) an interpolymer of maleic anhydride and ethylene, wherein (2) is present in an amount of from about 0.05 to about 10% by weight, based on the total weight of resin-forming components.

3. A reactive, linear ethylenically unsaturated polyester resin which comprises the reaction product of (1) a reactive, essentially linear ethylenically unsaturated polyester resin prepared by esterifying maleic anhydride, phthalic anhydride, and propylene glycol, and (2) an interpolymer of maleic anhydride and ethylene, wherein (2) is present in an amount of from about 0.05 to about 10% by weight, based on the total weight of resin-forming components.

4. A polymerizable resinous composition of matter capable of being cured to a substantially insoluble and infusible state upon the addition of a superoxide polymerization catalyst comprising (1) the reaction product of (a) a reactive, essentially linear ethylenically unsaturated polyester resin, prepared by esterifying an α,β-ethylenically unsaturated polycarboxylic acid with a saturated aliphatic polyol, with (b) from about 0.05 to about 10% by weight, based on the total weight of resin-forming components, an interpolymer of an α,β-ethylenically unsaturated dicarboxylic acid anhydride and a monoolefin having a terminal methylene group, (2) an ethylenically unsaturated monomeric cross-linking agent for said (1) containing a $CH_2$=C< group and having a boiling point of at least 60° C., and (3) from about 0.001% to 0.3% by weight, based on the weight of said (1) and said (2), of a polymerization inhibitor.

5. A polymerizable resinous composition of matter capable of being cured to a substantially insoluble and infusible state upon the addition of a superoxide polymerization catalyst comprising (1) the reaction product of (a) a reactive, essentially linear ethylenically unsaturated polyester resin, prepared by esterifying an α,β-ethylenically unsaturated polycarboxylic acid with a saturated aliphatic polyol, with (b) from about 0.05 to about 10% by weight, based on the total weight of resin-forming components, an interpolymer of maleic anhydride and ethylene, (2) an ethylenically unsaturated monomeric cross-linking agent for said (1) containing a $CH_2$=C< group and having a boiling point of at least 60° C., and (3) from about 0.001% to 0.3% by weight, based on the weight of said (1) and said (2), of a polymerization inhibitor.

6. A polymerizable resinous composition of matter capable of being cured to a substantially insoluble and infusible state upon the addition of a superoxide polymerization catalyst comprising (1) the reaction product of (a) a reactive, essentially linear ethylenically unsaturated polyester resin, prepared by esterifying an α,β-ethylenically unsaturated polycarboxylic acid with a saturated aliphatic polyol, with (b) from about 0.05 to about 10% by weight, based on the total weight of resin-forming components, an interpolymer of maleic anhydride and ethylene, (2) styrene, and (3) from about 0.001% to 0.3% by weight, based on the weight of said (1) and said (2), of hydroquinone.

7. A polymerizable resinous composition of matter capable of being cured to a substantially insoluble and infusible state upon the addition of a superoxide polymerization catalyst comprising (1) the reaction product of (a) a reactive, essentially linear ethylenically unsaturated polyester resin, prepared by esterifying maleic anhydride, phthalic anhydride and propylene glycol, with (b) from about 0.05 to about 10% by weight, based on the total weight of resin-forming components, an interpolymer of maleic anhydride and ethylene, (2) styrene, and (3) from about 0.001% to 0.3% by weight, based on the weight of said (1) and said (2), of hydroquinone.

8. A process for the preparation of a reactive linear ethylenically unsaturated polyester resin which comprises heat-reacting (1) an ethylenically unsaturated polyester resin prepared by esterifying an α,β-ethylenically unsaturated polycarboxylic acid with a saturated aliphatic polyol, and (2) from about 0.05 to about 10% by weight, based on the total weight of resin-forming components, of an interpolymer of an α,β-ethylenically unsaturated dicarboxylic acid anhydride and monoolefin having a terminal methylene group, until an acid number of between about 95 and 5 is reached.

9. A process for the preparation of a reactive, linear ethylenically unsaturated polyester resin which comprises heat-reacting (1) an ethylenically unsaturated polyester resin prepared by esterifying an α,β-ethylenically unsaturated polycarboxylic acid with a saturated aliphatic polyol, and (2) from about 0.05 to about 10% by weight, based on the total weight of resin-forming components, of an interpolymer of maleic anhydride and ethylene, until an acid number of between about 95 and 5 is reached.

10. A process for the preparation of a reactive, linear ethylenically unsaturated polyester resin which comprises heat-reacting (1) an ethylenically unsaturated polyester resin prepared by esterifying maleic anhydride, phthalic anhydride and propylene glycol, and (2) from about 0.05 to about 10% by weight, based on the total weight of resin-forming components, of an interpolymer of maleic anhydride and ethylene, until an acid number of between about 95 and 5 is reached.

References Cited by the Examiner

UNITED STATES PATENTS

| | | | |
|---|---|---|---|
| 2,047,398 | 7/36 | Voss et al. | 260—78.5 |
| 2,255,313 | 9/41 | Ellis | 260—861.4 |
| 2,378,629 | 6/45 | Hanford | 260—78.5 |

WILLIAM H. SHORT, *Primary Examiner*